United States Patent [19]
Salg

[11] Patent Number: 6,135,232
[45] Date of Patent: Oct. 24, 2000

[54] STEERING AXLE WITH HYDROSTATIC TWO-CIRCUIT STEERING SYSTEM FOR AGRICULTURAL FORESTRY AND CONSTRUCTION VEHICLES

[75] Inventor: Ditmar Salg, Salzweg, Germany

[73] Assignee: ZF Friedrichshafen AG, Friedrichshafen, Germany

[21] Appl. No.: 09/206,117

[22] Filed: Dec. 4, 1998

[30] Foreign Application Priority Data

Dec. 12, 1997 [DE] Germany ............... 197 55 278

[51] Int. Cl.[7] ................................ B62D 5/06
[52] U.S. Cl. ............... 180/417; 180/432; 180/433
[58] Field of Search ................ 180/417, 432, 180/433, 434, 436, 439, 437, 435

[56] References Cited

U.S. PATENT DOCUMENTS

| | | | |
|---|---|---|---|
| 3,101,808 | 8/1963 | Gordon | 180/79.2 |
| 3,720,282 | 3/1973 | Bianchetta et al. | 180/79.2 |
| 3,776,356 | 12/1973 | France | 180/79.2 |
| 4,449,600 | 5/1984 | Telfer | 180/132 |
| 4,475,615 | 10/1984 | Stanek | 180/160 |

FOREIGN PATENT DOCUMENTS

| | | | |
|---|---|---|---|
| 0 620 147 A1 | 10/1994 | European Pat. Off. | |
| 0620147 A1 | 10/1994 | European Pat. Off. | 180/132 |
| 24 06 566 | 8/1975 | Germany. | |
| 27 33 315 A1 | 2/1979 | Germany. | |
| 32 05 979 C3 | 9/1983 | Germany. | |
| 1478629 | 12/1974 | United Kingdom | 180/132 |
| 1 478 629 | 7/1977 | United Kingdom. | |

OTHER PUBLICATIONS

Japanese Abstract, JP 07 257 413A, dated Oct. 9, 1995 "Fitting Structure for Power Steering Cylinder" issued to Ishikawajima Shibaura Mach Co Ltd.

Japanese Abstract, JP 08 183 469A, dated Jul. 16, 1996 "Power Cylinder for Power Steering" issued to Koyo Sheiko Co Ltd.

*Primary Examiner*—Eric Culbreth
*Assistant Examiner*—J. Allen Shriver
*Attorney, Agent, or Firm*—Davis and Bujold

[57] ABSTRACT

A steering axle with hydrostatic two-circuit steering system for agricultural, forestry and construction vehicles. The steering axle includes a first double-acting pressure medium cylinder (1) which in the area of its center is connected with an axle bridge housing (2) and at its two ends with joint housings (4, 5) via tie bars (3) and an additional second double-acting pressure medium cylinder (6) which is mounted on one side of the axle. The second cylinder acts simultaneously together with the first pressure medium cylinder (1). In this manner a two-circuit steering system is obtained. At the same time said second double-acting pressure medium cylinder (6) is connected at one end via a ball joint (7) with a joint housing (5) and at the other end is fastened on the axle bridge housing (2).

3 Claims, 1 Drawing Sheet

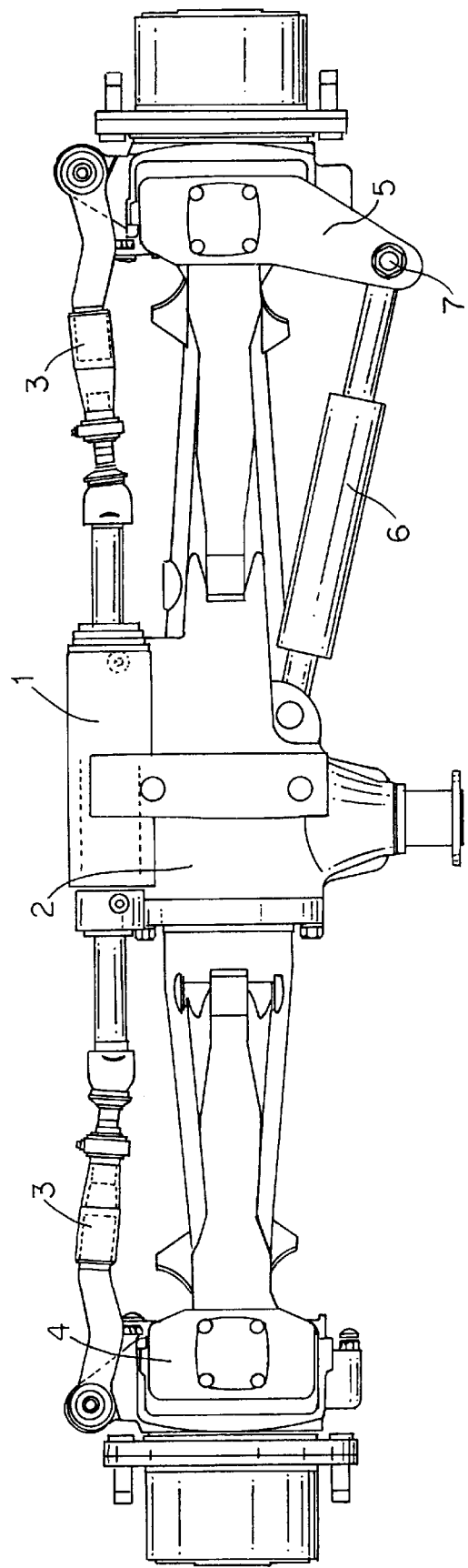

STEERING AXLE WITH HYDROSTATIC TWO-CIRCUIT STEERING SYSTEM FOR AGRICULTURAL FORESTRY AND CONSTRUCTION VEHICLES

The invention relates to a steering axle with hydrostatic two-circuit steering system for agricultural, forestry and construction vehicles.

BACKGROUND OF THE INVENTION

Steering axles with hydrostatic steering system for agricultural, forestry and construction vehicles having one steering circuit are known already, one example of this having been described in German Patent No. 32 05 979.

One-circuit steering systems of that kind, pursuant to specific legal regulations, are admissible only for a preset maximum speed. For high-speed agricultural, forestry and construction vehicles, a hydrostatic two-circuit steering system is required.

The problem on which the invention is based is to provide a steering axle with a hydrostatic two-circuit steering system for agricultural, forestry and construction vehicles.

SUMMARY OF THE INVENTION

The steering axle, according to the present invention, for agricultural, forestry and construction vehicles includes a first double-acting pressure medium cylinder, which adjacent its center, is connected with an axle bridge housing and at both ends with joint housings, via tie rods. In addition a second double-acting pressure medium cylinder is mounted upon one side of the axle. This second cylinder simultaneously acts together with the first pressure medium cylinder. In this manner, a two-circuit steering system is obtained. At the same time, the second double-acting pressure medium cylinder is connected at one end with one of the joint housings, via a ball joint, and at the other end is fastened on the axle bridge housing. This introduction of the steering force of the second pressure medium cylinder on only one joint housing is enough, since both joint housings are connected by the piston rod of the first pressure cylinder and the tie rods attached in both directions.

The first double-acting pressure medium cylinder is preferably secured to a sleeve integrally cast on the axle bridge housing.

In an advantageous development of the invention, the first double-acting pressure medium cylinder has an outer thread by means of which it is braced with a cap nut on one side and with a snap ring or recess in its outer outline on the other side of the sleeve.

At least one of the two double-acting pressure medium cylinders advantageously consists of one cylinder tube, one piston, one piston rod, one cylinder inner space and two guide rings with a pressure medium supply acting as closing the components. The supply is effected through a opening in the cylinder tube and an added opening in the guide ring. The latter opening discharges in an annular space around the piston rod which forms the communication to the interior of the cylinder.

The pressure medium here is preferably connected to an adapter member which is inserted in at least one of the openings.

BRIEF DESCRIPTION OF THE DRAWING

An embodiment of the invention will now be described, by way of example, with reference to the only FIGURE which illustrates a steering axle with hydrostatic two-circuit steering system.

DESCRIPTION OF THE PREFERRED EMBODIMENT(s)

A first double-acting pressure medium cylinder 1 is connected adjacent its center with an axle bridge housing 2 and at both ends with joint housings 4, 5 via tie rods 3. An additional second double-acting pressure medium cylinder 6 is mounted on one side of the axle. This second cylinder acts simultaneously with the first pressure medium cylinder 1. In this manner a two-circuit steering system is obtained. The second double-acting pressure medium cylinder 6 is connected at one end with one of the joint housings 5, via a ball joint 7, and at the other end is fastened on the axle bridge housing 2.

Reference Numerals 1 first pressure medium cylinder
2 axle bridge housing
3 tie rod
4 joint housing
5 joint housing
6 second pressure medium cylinder
7 ball joint

What is claimed is:

1. A steering axle with hydrostatic steering system for agricultural, forestry and construction vehicles, the steering axle comprising
   a first double-acting pressure medium cylinder (1) which adjacent a center point is connected with an axle bridge housing, (2) the first double acting pressure medium cylinder having opposite ends which are connected with joint housings (4, 5) via tie rods (3), and
   wherein a second double-acting pressure medium cylinder (6) is additionally mounted on one side of the axle to act simultaneously with said first pressure medium cylinder (1) and thus obtain a two-circuit steering system, said second double-acting pressure medium cylinder (6) is connected at one end, via a ball joint (7), with one of the joint housings (5) and at an opposite end is fastened on said axle bridge housing (2).

2. The steering axle according to claim 1, wherein said first double-acting pressure medium cylinder (1) is fastened on a sleeve integrally cast on said axle bridge housing (2).

3. A steering axle with hydrostatic steering system for agricultural, forestry and construction vehicles, the steering axle comprising:
   a first double-acting pressure medium cylinder (1) having a center point connected with an axle bridge housing, (2) the first double acting pressure medium cylinder having opposite ends which are connected with joint housings (4, 5) via tie rods (3),
   a second double-acting pressure medium cylinder (6) is additionally mounted on one side of the axle to act simultaneously with said first pressure medium cylinder (1) and thus obtain a two-circuit steering system, said second double-acting pressure medium cylinder (6) is connected at one end, via a ball joint (7), with one of the joint housings (5) and at an opposite end is fastened,on said axle bridge housing (2) and wherein said first double-acting pressure medium cylinder (1) is fastened on a sleeve integrally cast on said axle bridge housing (2).

* * * * *